United States Patent [19]

Dehennau et al.

[11] Patent Number: 4,657,497
[45] Date of Patent: Apr. 14, 1987

[54] DEVICE FOR THE COEXTRUSION OF THERMOPLASTICS

[75] Inventors: Claude Dehennau, Waterloo; Marc Kerger; Léon Dubuisson, both of Brussels, all of Belgium

[73] Assignee: Solvay & Cie (Societe Anonyme), Brussels, Belgium

[21] Appl. No.: 800,899

[22] Filed: Nov. 22, 1985

Related U.S. Application Data

[63] Continuation of Ser. No. 591,763, Mar. 20, 1984, abandoned.

[51] Int. Cl.⁴ .............................................. B29C 47/06
[52] U.S. Cl. ................................. 425/133.1; 425/381; 425/466
[58] Field of Search ................. 425/133.1, 133.5, 141, 425/190, 192 R, 192 S, 376 R, 376 A, 380, 381, 462, 463, 466, 467, 532; 264/540, 541, 173

[56] References Cited

U.S. PATENT DOCUMENTS

| | | | |
|---|---|---|---|
| 3,860,372 | 1/1975 | Newman, Jr. | 425/133.1 |
| 3,895,899 | 7/1975 | Weber et al. | 425/461 |
| 3,947,173 | 3/1976 | Dougherty | 425/133.1 |
| 4,003,689 | 1/1977 | Harrison et al. | 425/381 |
| 4,047,868 | 9/1977 | Kudo et al. | 425/133.1 |
| 4,472,129 | 9/1984 | Siard | 425/376 A |

Primary Examiner—Jay H. Woo
Assistant Examiner—J. Fortenberry
Attorney, Agent, or Firm—Spencer & Frank

[57] ABSTRACT

A device for avoiding flow disturbances and stagnation during the production of hollow or solid multilayer elongate structures. The device for the coextrusion of thermoplastics comprises an elongate central core and an external structure surrounding the central core and defining, with the latter, a central extrusion channel which runs in the direction of the longitudinal axis of the device towards an outlet orifice, in which device the external structure consists of at least one element, each element comprising a toroid feed chamber surrounding the central extrusion channel and connected to a feed source of molten thermoplastic, with an extrusion passage having an external wall and connecting the periphery of the toroid feed chamber to the central extrusion channel, and with an adjustment ring, movable transversely relative to the longitudinal axis of the device, to provide control of the flux of molten thermoplastic flowing from the toroid feed chamber to the central extrusion channel, characterized in that each adjustment ring delimits in combination a portion of the toroid feed chamber in its part which is connected to the extrusion passage and a portion of the external wall of the extrusion passage in its part which is connected to the toroid feed chamber, the other portion of the external wall of the extrusion passage connected to the central extrusion channel being delimited by an internal face of a mandrel which surrounds the central extrusion channel and against which mandrel the adjustment ring can move transversely.

10 Claims, 9 Drawing Figures

DEVICE FOR THE COEXTRUSION OF THERMOPLASTICS

This application is a continuation of application Ser. No. 591,763, filed Mar. 20, 1984, now abandoned.

BACKGROUND OF THE INVENTION

1. Field of the Invention

The present invention relates to a device particularly suitable for the coextrusion of thermoplastics and especially of thermoplastics which are sensitive to thermal degradation.

2. Background of the Art

It is already known to use devices for the coextrusion of thermoplastics, especially to produce tubular articles or multi-layer films combining thermoplastics having different and/or complementary properties.

Thus, U.S. Pat. No. 4,047,868 describes a device for the coextrusion of tubular articles, which comprises an elongate central core and an external structure surrounding the core and defining, together with the latter, an extrusion channel extending, in the direction of the longitudinal axis of the device, to an outlet orifice, in which device the external structure consists of a series of successive elements each comprising a toroid feed chamber surrounding the extrusion channel and connected to a feed source of molten thermoplastic, with an extrusion passage connecting the periphery of the toroid feed chamber to the extrusion channel and with an adjustment ring, movable transversely relative to the longitudinal axis of the device, to provide control of the flux of molten thermoplastic flowing from the toroid feed chamber to the extrusion channel.

In the devices of this type, the adjustment ring generally acts only on a portion of the extrusion passage close to the extrusion channel, resulting in a—sometimes substantial—change in the convergence zone of the molten thermoplastic, thus creating a local potential source of instability of flow which can moreover cause thermal degradation of the processed polymer or polymers.

Moreover, the currently known coextrusion devices are so designed as to permit the production of coextruded articles comprising a defined number of layers and it is not possible to vary this number.

Finally, the currently known coextrusion devices are so designed as to permit either the extrusion of multilayer tubular articles such as hoses or the extrusion of multi-layer flat articles such as sheeting, and with such devices it is not possible easily to change the type of article produced.

SUMMARY OF THE INVENTION

It is the object of the present invention to provide a coextrusion device which makes it possible to eliminate the abovementioned disadvantages and which is characterised by very great versatility in use.

To this effect, the present invention relates to a device for the coextrusion of thermoplastics which comprises an elongate central core and an external structure surrounding the central core and defining, with the latter, a central extrusion channel which runs in the direction of the longitudinal axis of the device towards an outlet orifice, in which device the external structure consists of at least one element comprising a toroid feed chamber surrounding the central extrusion channel and connected to a feed source of molten thermoplastic, with an extrusion passage connecting the periphery of the toroid feed chamber to the central extrusion channel and with an adjustment ring, movable transversely relative to the longitudinal axis of the device, to provide control of the flux of molten thermoplastic flowing from the toroid feed chamber to the central extrusion channel, characterised in that the adjustment ring delimits a portion of the toroid feed chamber in its part which is connected to the extrusion passage and a portion of the external wall of the extrusion pssage in its part which is connected to the toroid feed chamber, the other portion of the external wall of the extrusion passage connected to the central extrusion channel being delimited by the internal face of a mandrel which surrounds the central extrusion channel and against which the adjustment ring can move.

In the device according to the invention, the inlet part of the extrusion passage is therefore machined in the adjustment ring and any movement of the latter no longer causes a substantial change in the zone of convergence of the molten thermoplastic. Consequently, stable flow of this material through the extrusion passage is achieved. Moreover, any movement of the adjustment ring for producing a local reduction of the flux of molten thermoplastic is accompanied by a corresponding local reduction of the cross-section of the toroid feed chamber and consequently by a local reduction of its useful volume, and this contributes to ensuring better stability of operation.

According to a preferred embodiment of the device according to the invention, the external structure consists of a series of identical elements which are therefore interchangeable and whose number can easily be changed in accordance with the structure of the product to be manufactured. Thus the device according to the invention can comprise up to seven elements, and even more if desired.

Because of the fact that these elements are identical, their machining can be carried out as a batch operation, which substantially reduces the cost of the coextrusion device. It is however, obvious that the device according to the invention can be produced employing a succession of different elements for producing the external structure.

According to an advantageous embodiment, the assembly of the constituents of the elements forming the external structure of the coextrusion device is machined in such a way that these elements have contiguous faces at the adjustment ring of each element, with the latter able to slide freely along these faces under the action of the adjustment screw.

During assembly of the coextrusion device, the external structure is assembled together by a series of clamping bolts parallel to the longitudinal axis of the device, the clamping torque of these bolts being greater than zero but less than 200 N.m. Moreover, to avoid any jamming during the movement of the adjustment rings, the faces in contact at the rings are of different hardnesses. Thus, for example, one contact face only may be nitrided or heat-treated.

According to another embodiment of the device according to the invention, which can prove very valuable, the mandrel surrounding the central extrusion channel of one or more elements of the external structure can be so machined as to interrupt the extrusion passage over at least one part of its periphery, except for the part diametrically opposite to the feed source of molten thermoplastic from the corresponding toroid feed chamber. In this case it is possible, with the device according to the invention, to produce multi-layer elongate structures of which at least one of the layers only partially covers the preceding layer. In this embodiment it is important not to interrupt the extrusion passage in a part which is diametrically opposite to the feed source of molten thermoplastic from the toroid feed chamber, to avoid any stagnation of material which might cause thermal degradation.

In another preferred embodiment of the device according to the invention, the cross-section of the toroid feed chamber of each element of the external structure varies progressively along its periphery, the maximum cross-section facing its connection to the feed source of the molten thermoplastic and the minimum cross-section being located at a point diametrically opposite to this connection. In this way, the volume of the toroid feed chamber can be adapted, at all points, in respect of the volume of molten thermoplastic which is to be fed into the extrusion passage, and this makes a further contribution to making the operation of the extrusion device less variable with time.

The extrusion device according to the invention can advantageously be equipped with a thermostatically controlled fluid circuit so as to allow its constituents to be kept at a precise temperature.

According to a particular embodiment of the device according to the invention, the central core delimits, together with the external structure, a central extrusion channel of annular cross-section, which opens into an outlet orifice, also of annular cross-section, which constitutes the extrusion die. The device according to this embodiment is hence perfectly suitable for the production of multi-layer tubular elongate structures such as hoses or continuous tubular parisons which are for example suitable for the production of hollow bodies by blow-moulding.

The elongate tubular structures which can be produced by means of the device can have successive layers of different thermoplastics but of course these structures can also have alternate similar layers. In the latter case it suffices to feed two or more elements of the external structure of the device from one and the same feed source of molten thermoplastic, the equilibration of the feed rates of these elements being in particular achievable by adjusting the diameter of the connection of each toroid feed chamber to the feed source of the particular elements concerned.

According to another particular embodiment of the device according to the invention, the central core can have an axial central channel which can be connected to a source of molten thermoplastic. In that case the downstream end of the central core is kept set back from the outlet orifice of the device and the latter is generally of circular cross-section. The device according to this embodiment is hence perfectly suited to the production of multi-layer solid elongate structures whereof the central part consists of the thermoplastic fed through the central axial channel of the central core onto which the successive annular layers fed through the extrusion channel are applied at the end of this core or beyond. In this embodiment, the coextrusion device according to the invention can fulfil the function of the feedblock and can for example directly feed a flat die connected to the outlet orifice of the device.

It will thus be seen that the device according to the invention can be used either to produce elongate multi-layer structures of annular cross-section or to produce solid elongate multi-layer structures, the change being made by simple modification of the central core with the external structure being retained.

BRIEF DESCRIPTION OF THE DRAWING

The extrusion device according to the invention is furthermore explained in more detail through the particular embodiments which will now be described and for the description of which reference will be made to the figures in the attached drawings, in which.

DESCRIPTION OF THE PREFERRED EMBODIMENTS

Figure 1:
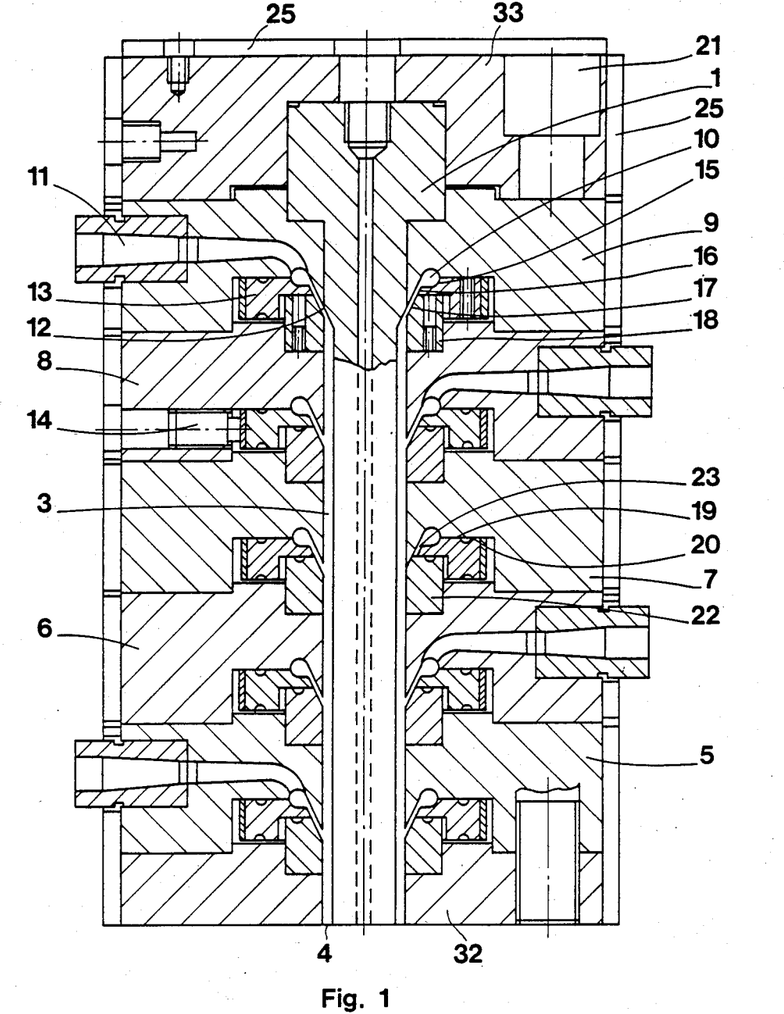
FIG. 1 is a cross-sectional view and elevation view of the device according to the invention, suitable for the coextrusion of annular multi-layer elongate articles.

As may be seen in FIG. 1, a coextrusion device according to the invention and suitable for the production of multi-layer tubular articles comprises an elongate central core 1 of substantially cylindrical cross-section and an external structure 2 surrounding the central core and defining, with the latter, a central extrusion channel 3 of substantially annular cross-section running in the direction of the longitudinal axis of the device, toward an outlet orifice 4 of annular cross-section identical to that of the central extrusion channel 3. The external structure 2 consists of a series of five elements, 5, 6, 7, 8, 9 each comprising a toroid feed chamber 10 surrounding the central extrusion channel 3 and a feed channel 11 for this chamber which can be connected to a feed source of molten thermoplastic such as, for example, an extruder (not shown), there being an extrusion passage 12 connecting the periphery of the toroid feed chamber 10 to the central extrusion channel 3 and an adjustment ring 13 movable transversely relative to the longitudinal axis of the device by means of the adjustment screw 14, the function of this adjustment ring being to allow control of the flux of molten thermoplastic flowing from the toroid feed chamber 10 to the central extrusion channel 3. The elements 5, 6, 7, 8 and 9 are clamped between two end elements 32 and 33 which ensure, by means of bolts 21, that the whole of the external structure holds together.

According to the invention, the adjustment ring 13 delimits a portion 15 of the toroid feed chamber 10, in its part which is connected to the extrusion passage 12, and a portion 16 of the external wall of the extrusion passage 12 connected to the toroid feed chamber 10, the other portion 17 of the external wall of the extrusion passage 12 being delimited by the internal face of a mandrel 18 which surrounds the central extrusion channel 3 and against which the adjustment ring 13 can move.

In the device thus produced, the inlet part of the extrusion passage 12 is thus machined into the adjustment ring 13 and because of the profile which this part is given any transverse movement of this adjustment ring 13 only causes a minor change in the convergence zone of the molten thermoplastic. Moreover any transverse movement of the adjustment ring 13 for the purpose of locally reducing the flux of molten thermoplastic in the extrusion passage 12 is accompanied by a local reduction in cross-section and hence of the volume of the toroid feed chamber 10.

As can be seen clearly in the Figure, the five elements 5, 6, 7, 8 and 9 are identical and therefore interchangeable.

In the coextrusion device described above, the set of components forming the external structure 2 is machined in such a manner that these elements exhibit contiguous faces 19, 20 at the adjustment ring 13, and the latter can slide along these faces under the action of the adjustment screw 14.

During assembly of the coextrusion device, the external structure 2 is held together by a series of four clamping bolts 21 parallel to the longitudinal axis of the device, the clamping torque of these bolts being kept at below 200 N.m. so as not to interfere with the transverse movement of the adjustment rings 13 of the various components 5, 6, 7, 8 and 9 which constitute the external structure 2. Moreover, in order to avoid any seizing-up during the movement of the adjustment rings 13, the faces 19, 20 which are in contact at these rings are of different hardnesses, with one of the faces having been subjected to a nitriding treatment.

In the coextrusion device described above, it is permissible, as is shown by the reference mark 22, to use one or more mandrels 18 surrounding the central extrusion channel 3, the mandrels being machined so as to interrupt the corresponding extrusion passage 23 over a part of its periphery. By using such mandrels it is thus possible to produce multi-layer elongate structures in which the layer of thermoplastic applied by the corresponding element 7 of the external structure 2 only partially covers the layer of thermoplastic applied by the preceding element.

Figure 2:
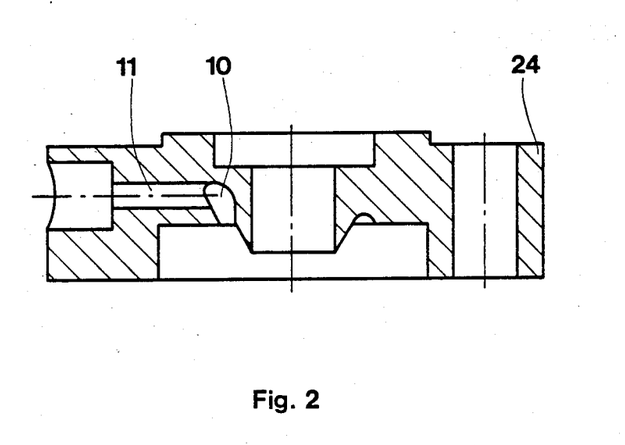
FIG. 2 is a view in cross-section and in elevation of a particular component which can be used in the device according to FIG. 1.
Figure 3:
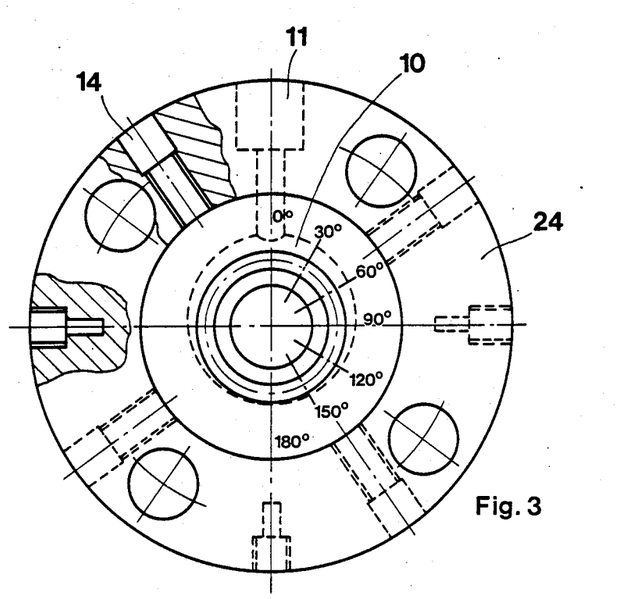
FIG. 3 is a plan and partial cross-sectional view of the component according to FIG. 2.
Figure 4:
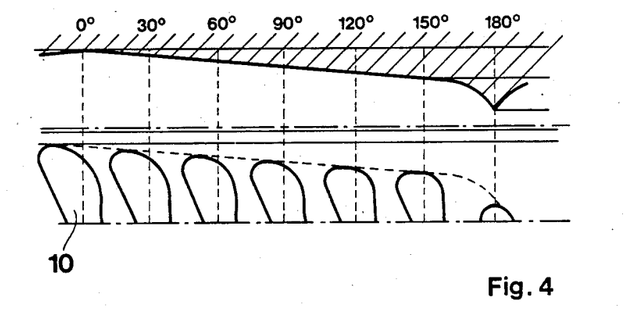
FIG. 4 is a view showing the cross-sections of the toroid feed chamber of the component according to FIG. 2.

According to another embodiment of the device described, which embodiment is shown in FIGS. 2 to 4, which represents a particular component 24 of one of the elements making up the external structure 2, the part of the toroid feed chamber 10 machined into this component can have a cross-section which varies progressively along its periphery, the maximum cross-section being located in front of the connection 11 to the feed source of molten thermoplastic and the minimum cross-section being located at a point diametrically opposite to this connection. FIG. 4 shows the variation in cross-section of the annular toroid chamber 10 as a function of the angular positions in FIG. 3. When operating in accordance with this embodiment, the volume of the toroid feed chamber 10 of each element 5, 6, 7, 8, 9 can be in all respects adapted to the volume of molten thermoplastic to be fed through the extrusion passage 12, and this contributes to ensuring good stability of flow during use of the coextrusion device.

Finally, the coextrusion device can be equipped with an external heat-insulating covering 25 and/or with heating elements and a thermostatically controlled fluid circuit (not shown), to permit efficient control of the heat conditioning of its constituents.

The device according to FIG. 1 is particularly suitable for the coextrusion of multi-layer tubular parisons intended for the production of hollow bodies by blow-moulding. For this purpose, the central core 1 can have a central channel to allow passage of a blowing fluid.

Figure 5:
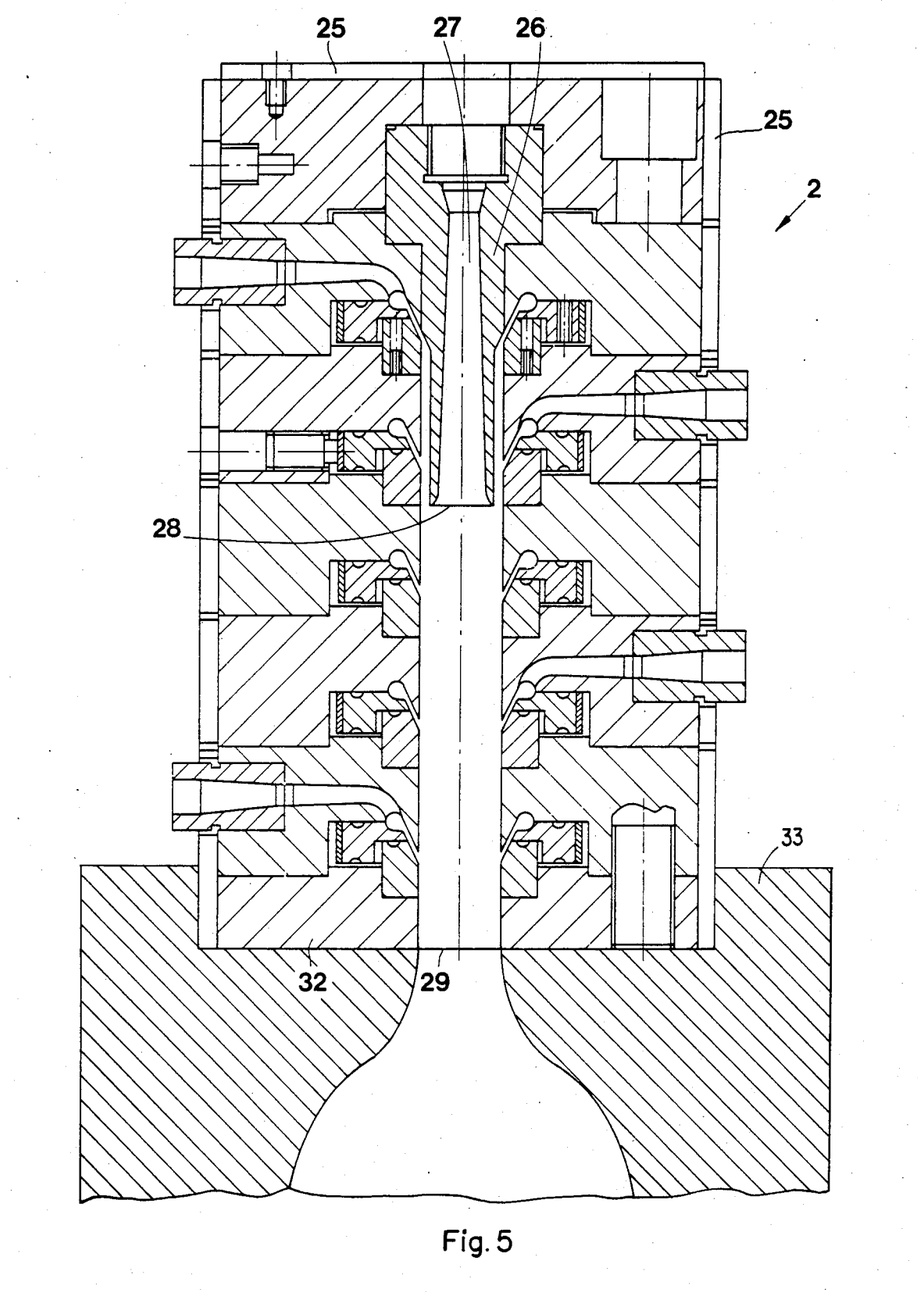
FIG. 5 is a view in cross-section and in elevation of the device according to FIG. 1, modified to permit the coextrusion of multi-layer solid elongate articles.
Figure 6:
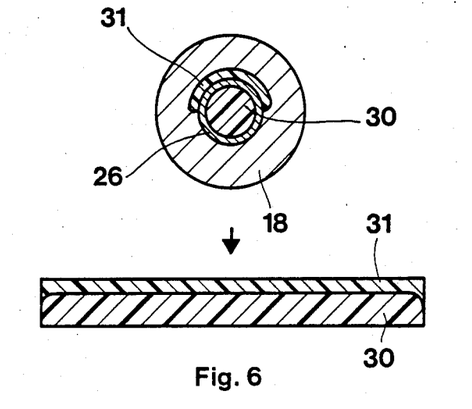
FIGS. 6 to 9 show different mandrels which can be used in the device according to FIG. 5, as well as the types of products which can be obtained with these mandrels.
Figure 7:
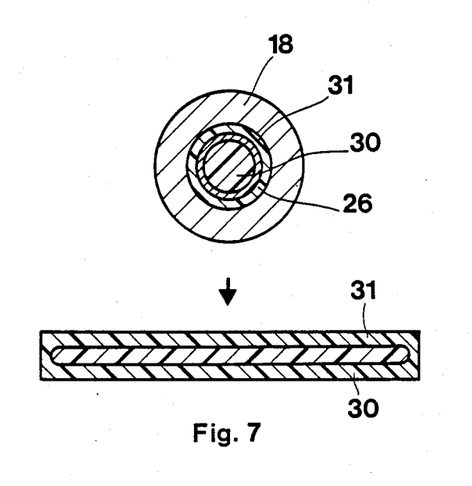
Figure 8:
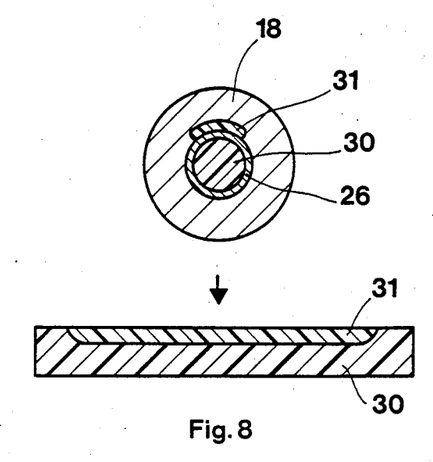
Figure 9:
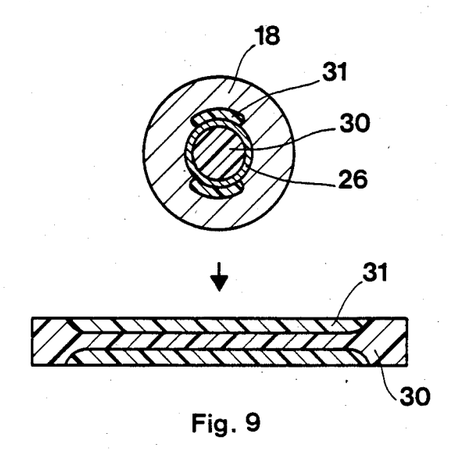

As shown in FIG. 5, the coextrusion device summarised in FIG. 1 and described above can easily be modified so as to permit the production of solid multi-layer structures. For this purpose, it suffices to remove the central core 1 of the device according to FIG. 1 and to replace it by a central core 26 as shown in FIG. 5. As may be seen in this Figure, the central core 26 has an axial central channel 27 which can be connected upstream to a source of molten thermoplastic (not shown). Moreover, the end 28 of the central core 26 is located set back, to an amount depending on the structures to be produced, from the outlet orifice 29 of the coextrusion device, this orifice therefore being of circular cross-section and capable of connection via the element 32 to, for example, a flat die 33 partially shown suitable for the production of flat sheeting.

With this device it is therefore possible to extrude a solid multi-layer elongate structure whose core consists of the thermoplastic introduced into the central channel 27 of the central extrusion nozzle 26, this core being partially or completely covered by successive layers of thermoplastic introduced through the elements of the external structure 2 of the coextrusion device.

Accordingly, in FIGS. 6 to 9 there are shown various multi-layer flat structures comprising layers of two different thermoplastics 30, 31, which structures can be produced using a coextrusion device according to FIG. 5 whose external structure only comprises a single element, the central nozzle having its end set back from the extrusion passage of the element of the external structure. Opposite each multi-layer structure the Figures show the type of mandrel 18 which can be used to produce it.

It will thus be seen that the co-extrusion device easily permits the production of hollow or solid multi-layer elongate structures in which the arrangement of the layers can easily be modified.

What is claimed is:

1. In a device for the coextrusion of thermoplastics which comprises an elongate central core and an external structure surrounding the central core and defining, with the latter, a central extrusion channel which runs in the direction of the longitudinal axis of the device towards an outlet orifice, in which device the external structure consists of at least one element, each element comprising a toroid feed chamber surrounding the central extrusion channel and connected to a feed source of molten thermoplastic; an extrusion passage having an external wall and connecting the periphery of the toroid feed chamber to the central extrusion channel, and an adjustment ring, movable linearly and transversely relative to the longitudinal axis of the device, to provide control of the flux of molten thermoplastic flowing from the toroid feed chamber to the central extrusion channel, the improvement wherein the external wall of the extrusion passage has a first portion which is connected to the toroidal feed chamber and a second portion which is connected to the central extrusion channel, and wherein each adjustment ring delimits in combination a portion of the toroid feed chamber in its part which is connected to the extrusion passage and the first portion of the external wall of the extrusion passage in its part which is connected to the toroid feed chamber;

and said external structure further comprising a mandrel provided for each adjustment ring, which mandrel has an internal face delimiting the second portion of the external wall of the extrusion passage in its part which is connected to the central extrusion channel, surrounds the central extrusion channel, and against which the adjustment ring can move linearly and transversely; and wherein the linear and transverse movement of the adjustment ring causes a change in the cross-sectional area of both the toroid feed chamber and the extrusion passage.

2. Device according to claim 1, wherein the external structure consists of a series of identical elements.

3. Device according to claim 1, wherein the external structure is held together by a series of clamping bolts positioned parallel to the longitudinal axis of the device and having a clamping torque which is greater than zero but less than 200 N.m.

4. Device according to claim 1, wherein each adjustment ring has contact faces and each said at least one element of said external structure has faces contiguous with the contact faces of each adjustment ring, respectively, which faces have different hardnesses to facilitate the transverse movement of the adjustment rings.

5. Device according to claim 1, wherein at least one mandrel surrounding the central extrusion channel interrupts the corresponding extrusion passage at one or more parts of its periphery except for the part diametrically opposite to the feed source of molten thermoplastic of the corresponding toroid feed chamber.

6. Device according to claim 1, wherein the cross-section of the toroid feed chamber of each element of the external structure varies progressively along its periphery, the maximum cross-section being located in front of its connection to the feed source of molten thermoplastic and the minimum cross-section being located at a point diametrically opposite to this connection.

7. Device according to claim 1, wherein the components of each element of the external structure are kept at a precise temperature by means of a circuit of thermostatically controlled fluid.

8. Device according to claim 1, wherein the central core delimits, together with the external structure, an extrusion channel of annular cross-section opening into an outlet orifice which is also of annular cross-section.

9. Device according to claim 1, wherein the central core has an axial central channel which can be connected upstream to feed source of molten thermoplastic, the said core having its downstream end set back from the outlet orifice of circular cross-section.

10. Device according to claim 9, wherein the orifice of circular cross-section is connected to a flat die.

* * * * *